US006926310B1

(12) United States Patent
Weh et al.

(10) Patent No.: US 6,926,310 B1
(45) Date of Patent: Aug. 9, 2005

(54) ACTUATION DEVICE, ESPECIALLY ON A RAPID-ACTION RECEPTION COUPLING

(76) Inventors: Erwin Weh, Siemensstrasse 5, D-89257 Illertissen (DE); Wolfgang Weh, Siemensstrasse 5, D-89527 Illertissen (DE)

( * ) Notice: Subject to any disclaimer, the term of this patent is extended or adjusted under 35 U.S.C. 154(b) by 0 days.

(21) Appl. No.: 09/914,961

(22) PCT Filed: Jan. 3, 2000

(86) PCT No.: PCT/EP00/01727

§ 371 (c)(1),
(2), (4) Date: Jan. 24, 2002

(87) PCT Pub. No.: WO00/52378

PCT Pub. Date: Sep. 8, 2000

(30) Foreign Application Priority Data

Mar. 1, 1999 (DE) .......................... 299 03 613 U

(51) Int. Cl.[7] .............................................. F16L 35/00
(52) U.S. Cl. ................................ 285/316; 137/614.05
(58) Field of Search ............................... 285/314, 315, 285/316; 137/613, 614.05

(56) References Cited

U.S. PATENT DOCUMENTS

| | | | | |
|---|---|---|---|---|
| 3,039,794 A | * | 6/1962 | De Cenzo | 137/614.03 |
| 3,492,027 A | * | 1/1970 | Herring | 285/18 |
| 3,510,153 A | * | 5/1970 | Newton | 285/18 |
| 4,723,797 A | * | 2/1988 | Veyrat | 285/316 |
| 5,095,947 A | * | 3/1992 | Weh et al. | 137/614.06 |
| 5,332,266 A | * | 7/1994 | Canale | 285/7 |
| 5,429,155 A | | 7/1995 | Brzyski et al. | |
| 5,439,258 A | * | 8/1995 | Yates | 285/313 |
| 5,575,510 A | * | 11/1996 | Weh et al. | 285/35 |
| 5,706,967 A | * | 1/1998 | Weh et al. | 220/203.01 |
| 6,035,894 A | * | 3/2000 | Weh et al. | 137/614.06 |
| 6,073,971 A | * | 6/2000 | Weh et al. | 285/35 |

FOREIGN PATENT DOCUMENTS

| | | |
|---|---|---|
| DE | 3427 248 A1 | 2/1986 |
| WO | WO 93/20378 | 10/1993 |
| WO | WO 98/04866 | 2/1998 |

* cited by examiner

Primary Examiner—Eric K. Nicholson
(74) Attorney, Agent, or Firm—Knobbe, Martens, Olson & Bear, LLP

(57) ABSTRACT

The aim of the invention is to achieve secure and simple handling of an activation device, especially on a rapid-action reception coupling for transferring gas-liquids and/or liquids—liquids or on valves comprising a tubular housing (11, 29) and a slide (41), which is mounted in such a way that it is displaceable in relation to the housing. Said slide is connected to a lever mechanism (42), To this end, the invention provides that the lever mechanism (42) is positioned in a sliding ring (40), which is mounted in such a way that it is displaceable in relation to the housing (11, 29).

18 Claims, 3 Drawing Sheets

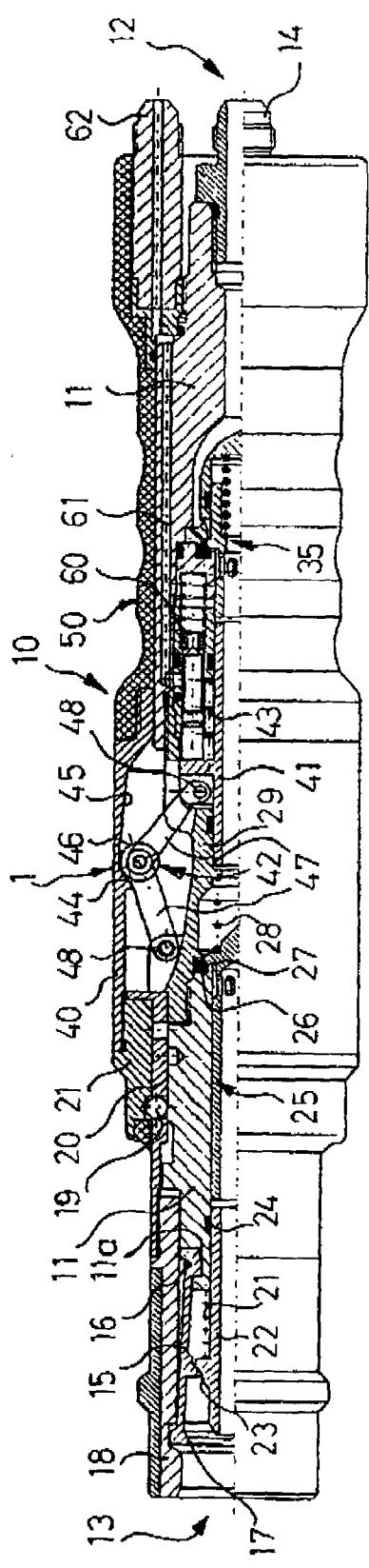
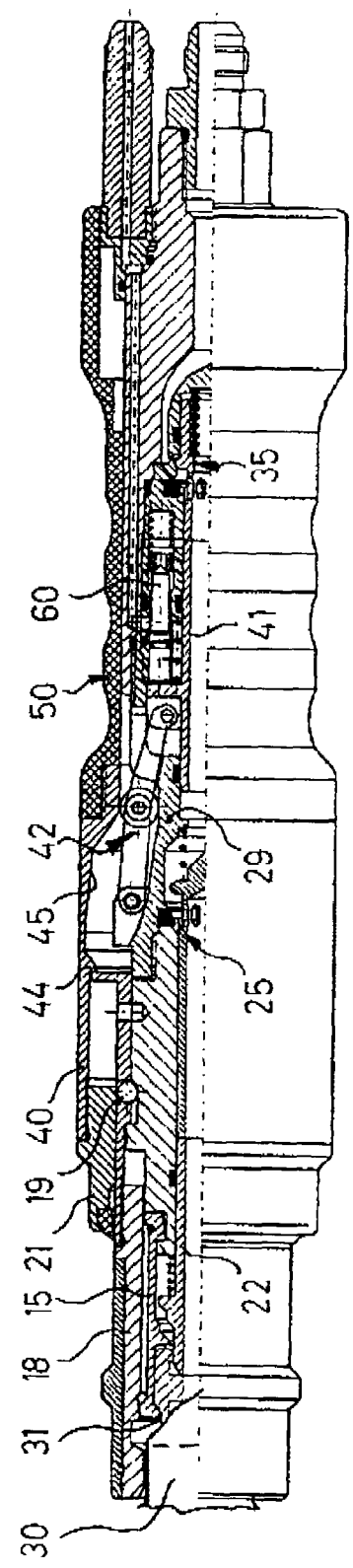
FIG.1
FIG.2

ACTUATION DEVICE, ESPECIALLY ON A RAPID-ACTION RECEPTION COUPLING

BACKGROUND OF THE INVENTION

1. Field of the Invention

The present invention relates to an actuation device, in particular on a rapid-action reception coupling for transferring gas-liquids and/or liquid-liquids.

2. Description of the Related Art

Such rapid-action reception couplings should enable a secure and rapid connectivity for transferring a fluid from a pressure source, from a refill bottle, for example. Of particular importance here is the simple, trouble-free operability of the rapid-action reception coupling, whereby trouble-free handling is guaranteed, even in unfavourable conditions such as dangerous fluids or at high connection pressures.

Such a rapid-action reception coupling is described in WO 98/04866 by the applicant, wherein the rapid-action reception coupling has a housing with a fluid inlet and a fluid outlet, and several valves are provided to ensure secure sealing of the rapid-action reception coupling to the point where the entire connection is realised. At the same time these valves are switched in a specific preset sequence after the rapid-action reception coupling is joined, whereby the outlet valve is first opened by sliding the rapid-action reception coupling onto a connection nipple, after which the collet chucks are closed and finally the inlet valve is opened by moving a control lever as actuation device. The control lever is hereby engaged by way of an eccentric shaft with the sliding sleeve for impacting of the collet chucks, and with a central sealing piston, which also releases the fluid inlet after the plug-in coupling has been successfully attached.

Although this effectively creates a secure connection, the structure of this coupling is still relatively expensive on account of the large number of components required. In addition, handling is relatively complicated, since, in addition to sliding on the coupling, the control lever has to be actuated, effectively eliminating the option of single-handed operation.

WO A 93/20378 of the applicant also discloses a rapid-action reception coupling, in particular for filling gas bottles, whereby a rapid-action reception device in the form of collet chucks with an engagement profile is provided in the vicinity of the outlet. Also described here is a hollow sealing piston slidably displaceable in the coupling housing, which is connected by way of an actuation device for closing or opening the collet chucks attached to a sliding sleeve. The actuation device also needs to be operated separately here, in the form of a lever, such that handling of this rapid-action connection is likewise capable of improvement.

SUMMARY OF THE INVENTION

Accordingly, the object of the present invention is to produce an actuation device, in particular a rapid-action reception coupling of the type initially outlined or on valves, which enables secure and especially simple handling with a simple structure.

This task is solved by an actuation device, in particular on a rapid-action reception coupling, according to the characteristics of claim 1. Preferred developments of the invention are the object of the sub-claims.

The proposed actuation device is distinguished by a minimal number of components, simple manufacturing and particularly simple operation, which is additionally especially secure. In particular for the preferred embodiment for filling gas tanks with gases such as propane or natural gas is gas is hereby prevented from escaping as the rapid-action reception coupling is being attached or uncoupled. This is particularly important for environmental pollution reasons, since with reception couplings currently in use a considerable amount of gas, which is located in the hose between the refill gas bottle and the reception coupling and which can escape during the coupling or decoupling action, is still lost with each filling procedure.

It is pointed out here that the proposed actuation device, in particular on a rapid-action reception coupling, is suited to different types of connection, but also only for switching valves. Profile forms such as outer or inner threads, undercuts or beads can also be provided to attach the coupling to the connection nipple, whereby the opposite collet chuck form is configured accordingly. The lever mechanism displaceable with the actuation device hereby enables secure locking of the collet chucks or similar locking elements. Of particular significance is the realisation of the actuation device, in particular on a rapid-action reception coupling, by means of an outer sliding ring, enabling fast and safe single-handed operation of the rapid-action reception coupling in a particularly easy manner.

An embodiment of the invention will now be explained in greater detail hereinbelow with reference to the accompanying diagrams, in which:

BRIEF DESCRIPTION OF THE DRAWINGS

FIG. 1 is a side view of a rapid-action reception coupling for a connection nipple with an attachment profile, whereby the rapid-action reception coupling is shown in the longitudinal half section and in the position before being attached;

FIG. 2 shows the rapid-action reception coupling according to FIG. 1, but in the closed position on the connection nipple;

DETAILED DESCRIPTION OF THE PREFERRED EMBODIMENTS

Figure 3:
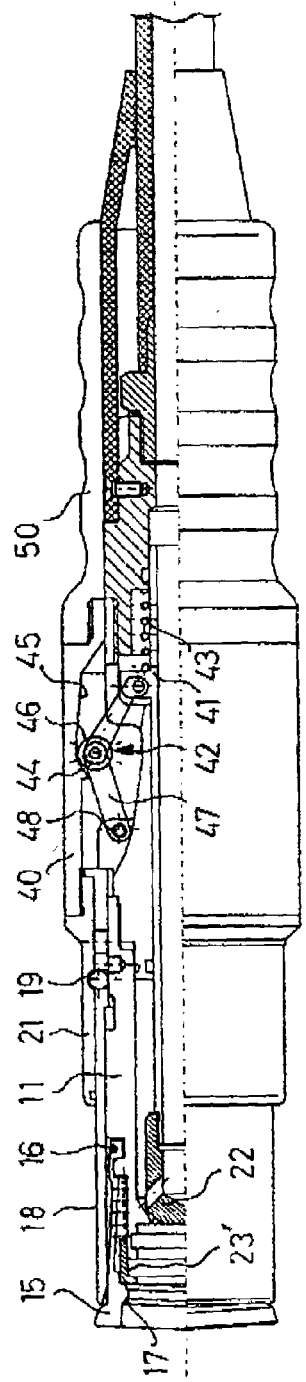
FIG. 3 is a modified embodiment similar to FIG. 1.

FIG. 1 illustrates a preferred embodiment of an actuation device 1 on a rapid-action reception coupling 10 prior to being attached to a connection nipple 30 (cf. FIG. 2).

Rapid-action reception coupling 10 has a tubular housing 11 or interconnected housing parts, whereby the right front side serves as inlet 12 and the left front side serves as outlet 13 for conveying the fluid to be transferred to connection nipple 30. Inlet 12 to housing 11 has a connection adapter 14 which can be attached to a hose or a pipe for conveying the fluid to be transferred. In this instance connection adapter 14 can be shaped to adapt to the fluid to be transferred, in particular to the respectively desired delivery angle, through cross-sections and the like.

Provided as locking elements on the front side lying opposite connection adapter 14, here outlet 13, are several oblong collet chucks 15 disposed in pipe form, which are spread radially outwards in the position illustrated here shortly before being slid onto connection nipple 30, as is illustrated by way of example in the abovementioned WO A 93/20378.

Oblong collet chucks IS, of which at least one, and generally three or six collet chucks, are arranged around housing 11, are hooked by, in this case, their right end on an annular groove 11a of housing 11 and at the same time prestressed by an annular spring 16, so that collet chucks 15 are spread radially outwards. This is supported by a radial enlargement 23 or a separate ring 23' (of FIG. 3). At, in this case, their left end on the inward angled surface collet chucks 15 exhibit positive-fitting engagement profiles 17 each configured corresponding to attachment profile 31 (cf. FIG. 2) of connection nipple 30.

Enclosing collet chucks 16 is an external sliding sleeve 18 which is guided on the cylindrical outer mantle of housing 11 and can be pushed with actuation device 1 axially in the direction of connection nipple 30, as is described hereinbelow. In this case sliding sleeve 18 exhibits an extension 20, loosely accommodating a locking ball 19. Arranged on its circumference is a locking ring 21 which presses locking ball 19 into a groove on housing 11 in the attached position (FIG. 2) and thereby enables the axial displacement of sliding sleeve 18, by means of which collet chucks 15 are stopped by the wrap-around by means of sliding sleeve 18 in the attached position.

Guided on the inner surface of housing 11 facing outlet 13 is a sealing piston 22 impacted by a spring 21, which lies with its front side on a conically designed sealing surface of connection nipple 30. Sealing piston 22 is sealed relative to collet chucks 15 by means of a sealing ring 24 set on the front end of housing 11, so that the gas-liquid and/or liquid—liquid flowing substantially along the central axis of rapid-action reception coupling 10 cannot escape outwards.

Also of significance here is an outlet valve 25 mounted centrally in housing 11, which seals off a sealing surface 27 by means of a sealing ring 26 on housing 11 in the closed position.

Outlet valve 25 is now impacted by a compression spring 28 which is guided by means of a centering stop 29 attached to housing 11. This outlet valve 25 ensures that in the uncoupled position illustrated here, or up to just before rapid-action reception coupling 10 is attached to connection nipple 30, the fluid conveyed by connection adapter 14 cannot escape when the connection stop-cock or the refuelling plant is open.

Outlet valve 25 is impacted by sealing piston 22 when rapid-action reception coupling 10 is slid onto connection nipple 30, whereby the latter is pressed in axially during attachment, in the process opening outlet valve 25.

This causes an inlet valve 35 of rapid-action reception coupling 10 to be closed which is then opened in the ensuing coupling procedure by actuation device 1 or a associated slide 41.

Of particular significance here is a sliding ring 40 guided on the outer circumference of housing 11, which is screwed to locking ring 21 is and impacts slide 41 by a lever mechanism 42. Slide 41 is hereby guided in housing 11, more precisely centering insert 29 attached thereto, and is impacted by a compression spring 43. As is evident from the illustration, the side of sliding ring 40 facing outlet 13 is screwed to locking ring 21, by means of which it can be moved out of the open position (FIG. 1) into the attached or locked position (FIG. 2). Sliding ring 40 is pushed manually by a hand grip 50 (here to the left), so that lever mechanism 42 is pushed into the stretched position, by means of which at the same time a stop 44 of sliding ring 40 on locking ring 21 is achieved. Based on stop 44a stepped carrier profile 45 is provided inside sliding ring 40 for lever mechanism 42, which controls the movement of both these components to one another.

Lever mechanism 42 here comprises a centrally arranged roller 46 and two levers 47 whose ends are fastened by bolts 48 at one point to housing 11 or to centering stop 29 attached thereto and elsewhere to slide 41. When sliding ring 40 is displaced by hand grip 50 roller 46 is moved along carrier profile 45, so that levers 47 are stretched.

Slide 41 is hereby pressed against inlet valve 35, so that the latter is moved into the open position. At the same time slide 41 is impacted by a compression spring, such that roller 46 rests on carrier profile 45 on the inner surface of sliding ring 40. In a preferred manner slide 41 is provided not only for controlled opening of inlet valves 35, but also for actuating a ventilation valve 60. This leads by way of a borehole 61 arranged in housing 11 to a ventilation connection 62, so that gas or liquid remaining in the attachment coupling can be recycled. This ventilation valve 60 likewise actuated by slide 41 also facilitates uncoupling, since a defined drop in pressure can occur here. With respect to carrier profile 45, on which knee-actuated lever mechanism 42 rests with roller 46, it is pointed out that the form, shown stepped here, can also be realised by a continuous transition, in order to realise the power transmission essential in this case. In the process levers 47 could also be mounted on sliding ring 40, while roller 46 can roll away on the housing side, on insert 29 or also on slide 41, for example.

The particular advantage of the form of carrier profile 45, here shown stepped, is that considerable power transmission is achieved by the initially minimal incline when roller 46 is rolled away on the inner surface of sliding ring 40 as it is displaced, so that slide 41 attached thereto can apply very high valve-opening forces, for example to inlet valve 35 and ventilation valve 60.

This translation is also supported by the lever length of levers 47 of lever mechanism 42. It is pointed out here that such a lever mechanism 42 can be arranged symmetrically in the lower region inside sliding ring 40, and also in a multiplex arrangement, if required.

FIG. 2 illustrates the attached position of rapid-action reception coupling 10. As is evident, when rapid-action reception coupling 10 is slid onto connection nipple 30 sealing piston 22 is pushed to the right, whereby at the same time sliding ring 40 provided on the outer circumference is pushed with hand grip 50 to the left. After a short distance of a few millimeters the inner surfaces of collet chucks 15 resting on conical outer surface 23 of sealing piston 22 become free of their locked position, so that they can snap inwards, and engagement profile 17 engages in correspondingly configured attachment profile 31 of connection nipple 30. Sliding sleeve 18 and its locking ball 19 are freed practically simultaneously for the axial movement to the left, since sliding sleeve 18 is also impacted by actuation device 1 by means of sliding ring 40 and locking ring 21.

As sliding sleeve 18 moves axially it engages over the radial outer ends of collet chucks 15, so that these can be held positively in their engaged position on connection nipple 30.

To disengage rapid-action reception coupling 10 and thus to return the attached position shown in FIG. 2 to the open position according to FIG. 1, sliding ring 40 is retracted somewhat with profiled hand grip 50 by hand. After locking ring 21 has travelled a short way (to the right) locking ball 19 is then released (outwards), whereupon sliding sleeve 18 is retracted at the same time. In this way collet chucks 15 can again spread radially outwards, whereby slide 41 is pushed by lever mechanism 42 to the left towards outlet end 13 at the same time. On account of curved carrier profile 45 this lifting movement of sliding ring 40 and thus of slide 41 can be used to precisely control inlet valve 35. Before the sealing contact between sealing piston 22 and sealing surface of connection nipple 30 is loosened, outlet valve 25 is securely closed. This almost simultaneous sequence constitutes very rapid closing of inlet or outlet valves 35 and 25, so that no amount of fluid can escape.

The sliding ring 40, together with lever mechanism 42, additionally allows rapid-action reception coupling 10 to be slid securely onto connection nipple 30, whereby collet chucks 15 are closed when the sealing contact is secured, since the open position of collet chucks 15 is maintained sufficiently long for the open position of collet chucks 15 to be disengaged by the axial displacement of sealing piston 22 and of sliding ring 40 in direct sequence to create the attachment.

Figure 4:
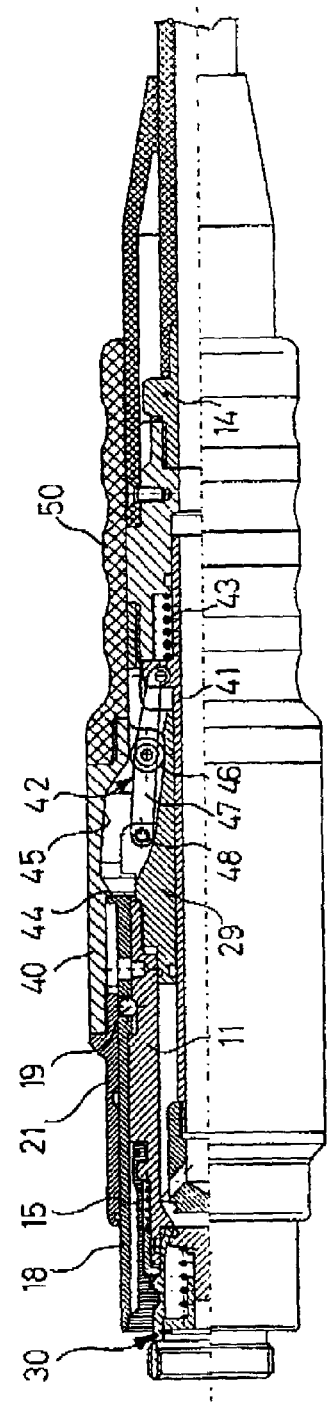
FIG. 4 is the modified embodiment according to FIG. 3, but in the attached position.

FIGS. 3 and 4 illustrate a simplified embodiment, wherein corresponding components are designated with the same reference numeral, as in FIGS. 1 and 2. Actuation device 1 here has the same function as described in FIGS. 1 and 2. Compared to the embodiment in FIGS. 1 and 2, there are no inlet valves or ventilation valves provided here, as rapid-action reception coupling illustrated should be particularly suited to propane gas filling. However, the here essential lever mechanism 42 has the same structure, whereby slide 41 actuated thereby is here attached to front sealing piston 22. In FIG. 3 sealing piston 22 thus forms a closed valve, whereas the sealing piston in FIG. 4 unblocks the passage of gas to the right through the axial movement of slide 41, and thus serves as outlet valve. Attached in addition to connection adapter 14 is a hose line which is enclosed by a kink-free sheath. This sheath is extensively enclosed in the non-attached position by hand grip 50 which is pushed towards connection nipple 30 for attaching, whereby lever mechanism 42 is brought to the stretched form, apart from the above described release of sliding sleeve 18 (without extension 20), here designed monobloc.

Figure 5:
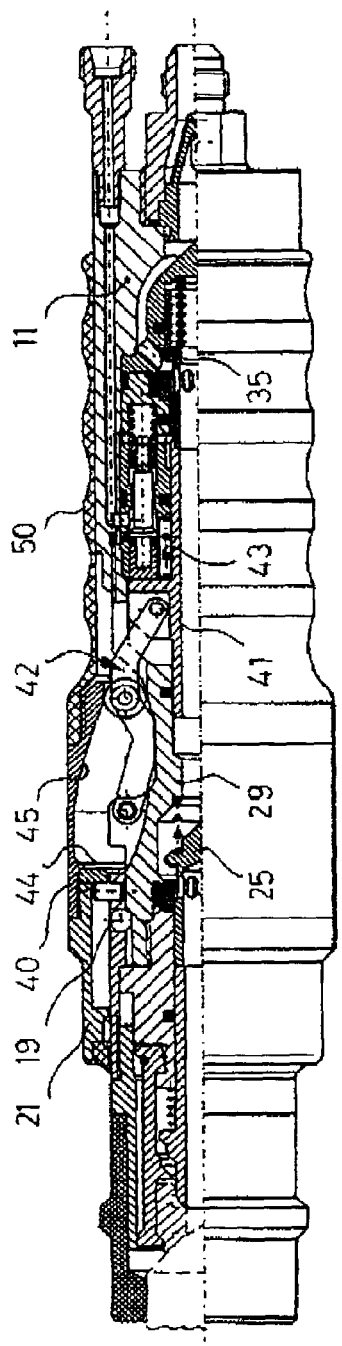
FIG. 5 is a further modified embodiment similar to FIG. 1 in the attached position.
Figure 6:
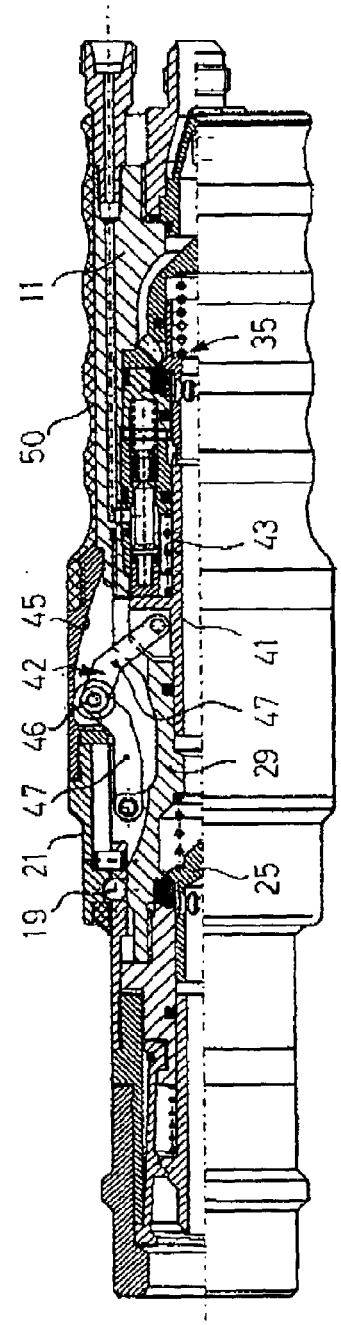
FIG. 6 shows the further modified embodiment according to FIG. 5.

FIGS. 5 and 6 illustrate a further embodiment, whereby corresponding components are designated with the same reference numerals as in FIGS. 1 and 2. Actuation device 1 here has the same function as described in FIGS. 1 and 2. By comparison to the embodiment in FIGS. 1 and 2 however levers 47 of lever mechanism 42 are bent at right angles with an otherwise identical structure. This effectively shortens the structural length and further improves the transmission ratio.

What is claimed is:

1. An actuation device for a rapid-action reception coupling for attachment to a connection nipple, the device comprising:
   a tubular housing;
   a slide mounted so as to be displaceable relative the housing;
   a sliding ring mounted so as to be displaceable relative the housing;
   a lever mechanism positioned in the sliding ring and attached to the housing, wherein the lever mechanism comprises:
      two levers of approximately equal length hingedly connected; and
      a roller positioned approximately at the connection of the two levers.

2. The device of claim 1, further comprising a common compression spring acting on the lever mechanism and the slide.

3. The device of claim 1, wherein the sliding ring comprises a stepped carrier profile on an inner surface of the sliding ring.

4. The device of claim 3, wherein the carrier profile defines a stop.

5. The device of claim 1, wherein the housing has a recessed surface and wherein the sliding ring is guided on the recessed surface of the housing.

6. The device of claim 1, further comprising at least one of an outlet valve, an inlet valve, and a relief valve wherein the at least one of an outlet valve, an inlet valve, and a relief valve is actuated by the slide and arranged centrally in the housing.

7. The device of claim 1, further comprising a locking ring attaching the sliding ring.

8. The device of claim 7, wherein the locking ring is threaded.

9. The device of claim 1, further comprising a locking element wherein the sliding ring can be checked by the locking element in at least one end position relative to the housing.

10. The device of claim 9, wherein the locking element comprises a ball.

11. The device of claim 1, further comprising bolts and a centering insert, the centering insert being arranged in the housing wherein the lever mechanism is configured as a toggle joint-attached at a first end to the centering insert with the bolts and on the opposite end to the slide.

12. The device of claim 11, further comprising a second lever mechanism wherein the lever mechanisms are arranged mirroring the main axis of the centering insert.

13. The device of claim 11, further comprising a carrier profile arranged on a peripheral surface of the centering insert.

14. The device of claim 1, further comprising a hand grip wherein the sliding ring is attached to the hand grip or the slide.

15. The device of claim 3, wherein the carrier profile exhibits a flatter elevation at a first end so as to induce an increased transmission of force.

16. A fluid line coupler for fixed attachment to a fluid line and removable attachment to a connection nipple, the coupler comprising:
   a tubular housing:
   a slide member coaxially arranged in the housing such that the slide member is displaceable along the common axis between a first sealed position and a second removable position;
   at least one collet member having an attachment surface matching the contour of the connection nipple wherein the first sealed position places the at least one collet member in contact with the connection nipple and the second removable position distances the at least one collet member from the connection nipple and wherein the at least one collet member is biased to the second removable position;
   a toggle mechanism attached to the housing and the slide member;
   a slide actuator having a cam surface, the slide actuator being coaxially mounted on the housing so as to be displaceable along the common axis such that displacement of the slide actuator along the common axis brings or removes the cam surface into contact with the toggle mechanism so as to induce the slide member to move between the first sealed and the second removable positions; and at least one valve positioned within the housing such that the valve directs fluid contained within the coupler during movement between the first sealed and second removable positions so as to inhibit escape of the fluid from the coupler.

17. A fluid line coupler for fixed attachment to a fluid line and removable attachment to a connection nipple, the coupler comprising:
- a tubular housing:
- a slide member coaxially arranged in the housing such that the slide member is displaceable along the common axis between a first sealed position and a second removable position;
- at least one collet member having an attachment surface matching the contour of the connection nipple wherein the first sealed position places the at least one collet member in contact with the connection nipple and the second removable position distances the at least one collet member from the connection nipple and wherein the at least one collet member is biased to the second removable position;
- a toggle mechanism attached to the housing and the slide member; and
- a slide actuator having a cam surface, the slide actuator being coaxially mounted on the housing so as to be displaceable along the common axis such that displacement of the slide actuator along the common axis brings or removes the cam surface into contact with the toggle mechanism so as to induce the slide member to move between the first sealed and the second removable positions.

18. An actuation device for a rapid-action reception coupling for attachment to a connection nipple, the device comprising:
- a tubular housing;
- a slide mounted so as to be displaceable relative the housing;
- a sliding ring mounted so as to be displaceable relative the housing;
- a lever mechanism positioned in the sliding ring and attached to the housing; and
- at least one of:
  - an outlet valve,
  - an inlet valve, and
  - a relief valve wherein the at least one of an outlet valve, an inlet valve, and a relief valve is actuated by the slide and arranged centrally in the housing.

* * * * *

UNITED STATES PATENT AND TRADEMARK OFFICE
CERTIFICATE OF CORRECTION

| | | |
|---|---|---|
| PATENT NO. | : 6,926,310 B1 | Page 1 of 1 |
| APPLICATION NO. | : 09/914961 | |
| DATED | : August 9, 2005 | |
| INVENTOR(S) | : Erwin Weh | |

It is certified that error appears in the above-identified patent and that said Letters Patent is hereby corrected as shown below:

<u>Title Page</u>
Item (57), ABSTRACT, line 2, delete "activation" and insert -- actuation --.

Item (57), ABSTRACT, line 4, delete "liquids-liquids" and insert -- liquid-liquids --.

<u>Column 6</u>
Claim 11, line 27, delete "joint-attached" and insert --joint attached --.

Signed and Sealed this

Twenty-ninth Day of May, 2007

JON W. DUDAS
*Director of the United States Patent and Trademark Office*